(12) United States Patent
Hasfura et al.

(10) Patent No.: US 12,153,650 B2
(45) Date of Patent: Nov. 26, 2024

(54) LABELING SYSTEM FOR A VEHICLE APPENDAGE

(71) Applicant: GM CRUISE HOLDINGS LLC, San Francisco, CA (US)

(72) Inventors: Andres Hasfura, San Antonio, TX (US); Abdelrahman Elogeel, Sunnyvale, CA (US); Alexander Pon, San Francisco, CA (US); Debanjan Nandi, Fremont, CA (US); Carden Bagwell, San Francisco, CA (US); Marzieh Parandehgheibi, San Francisco, CA (US); Teng Liu, Jersey City, NJ (US)

(73) Assignee: GM Cruise Holdings LLC, San Francisco, CA (US)

( * ) Notice: Subject to any disclaimer, the term of this patent is extended or adjusted under 35 U.S.C. 154(b) by 425 days.

(21) Appl. No.: 17/555,416

(22) Filed: Dec. 18, 2021

(65) Prior Publication Data

US 2023/0195840 A1    Jun. 22, 2023

(51) Int. Cl.
*G06F 18/214* (2023.01)
*G01S 17/00* (2020.01)

(52) U.S. Cl.
CPC .......... *G06F 18/2155* (2023.01); *G01S 17/00* (2013.01); *B60W 2420/408* (2024.01)

(58) Field of Classification Search
None
See application file for complete search history.

(56) References Cited

U.S. PATENT DOCUMENTS

| | | | |
|---|---|---|---|
| 10,891,518 B1 * | 1/2021 | Joshi | G06N 20/20 |
| 11,858,529 B1 * | 1/2024 | Costantino | G06V 20/58 |
| 2020/0202209 A1 * | 6/2020 | Mao | G06V 10/774 |

* cited by examiner

*Primary Examiner* — Leon Viet Q Nguyen
(74) *Attorney, Agent, or Firm* — Michael DiCato

(57) ABSTRACT

The present technology is directed to identifying and labeling a vehicle appendage. More specifically, the present technology is generally related to receiving one or more lidar points associated with a vehicle having an appendage and outputting a label to classify the vehicle and the appendage. In some examples, a first portion of the one or more lidar points associated with the vehicle having the appendage represents the vehicle and a second portion of the one or more lidar points associated with the vehicle having the appendage represents the appendage The present disclosure can further train a perception model to output the label to classify the vehicle and the appendage.

14 Claims, 5 Drawing Sheets

LABELING SYSTEM FOR A VEHICLE APPENDAGE

TECHNICAL FIELD

The subject matter of this disclosure relates in general to the field of a perception system for identifying objects represented in data received from sensors, and more particularly, to solutions for identifying and labeling a vehicle appendage in the data received from the sensors.

BACKGROUND

Autonomous vehicles (AVs) have computers and control systems that perform driving and navigation tasks conventionally performed by a human driver. As AV technologies continue to advance, a real-world simulation for AV testing has been critical in improving the safety and efficiency of AV driving. An exemplary AV can include various sensors, such as a camera sensor, a Light Detection and Ranging (LiDAR) sensor, a Radio Detection and Ranging (RADAR) sensor, and software for interpreting data received from the sensors. Collectively these sensors and software can be used to allow an AV to pilot itself.

SUMMARY

Figure 1:
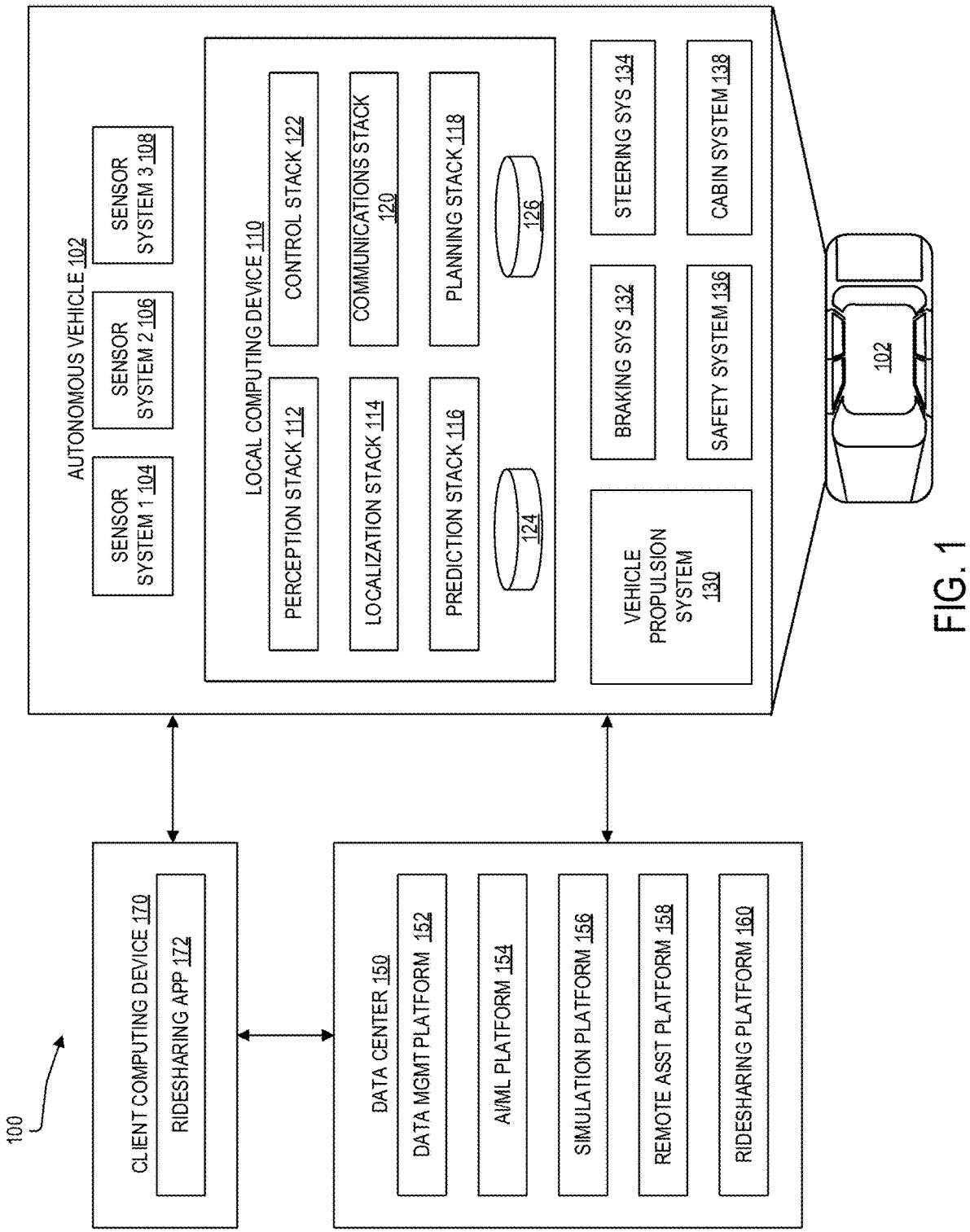
FIG. 1 illustrates an example of a system for managing one or more Autonomous Vehicles (AVs) in accordance with some aspects of the disclosed technology.

Disclosed are systems, apparatuses, methods, computer-readable medium, and circuits for identifying and labeling a vehicle appendage. According to at least one example, a method includes receiving one or more lidar points associated with a vehicle having an appendage and outputting a label to classify the vehicle and the appendage. In some examples, a first portion of the one or more lidar points associated with the vehicle having the appendage represents the vehicle and a second portion of the one or more lidar points associated with the vehicle having the appendage represents the appendage.

In some examples, the method further includes training a perception model to output the label to classify the vehicle and the appendage. In some instances, the training of the perception model includes inputting a plurality of instances of lidar points, wherein some instances of lidar points represent a vehicle with an associated appendage, into a machine learning algorithm. The machine learning algorithm is configured to output an identification of the vehicle, the appendage, and a relationship of the appendage to the vehicle when the vehicle with the associated appendage is present in the instance of lidar points.

Furthermore, the training the perception model includes inputting a loss value for each output of the machine learning algorithm that confirms correct labels and discourages incorrect labels of the vehicle, the appendage, and the relationship of the appendage to the vehicle, thereby training the machine learning algorithm into the perception model.

In some examples, the identification of the vehicle, the appendage, and the relationship of the appendage to the vehicle is based on a taxonomy.

In some instances, the outputting the label includes processing the one or more lidar points associated with the vehicle having the appendage to generate a first bounding box around the vehicle, processing the one or more lidar points associated with the vehicle having the appendage to generate a second bounding box around the appendage, identifying the appendage to the vehicle based on a relationship between the vehicle and the appendage, and associating the second bounding box with the first bounding box. In some examples, the appendage is not located within the first bounding box.

Moreover, the method includes localizing an autonomous vehicle based on the label classifying the vehicle and the appendage.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

As described herein, one aspect of the present technology is the gathering and using data available from various sources to improve quality and experience. The present disclosure contemplates that in some instances, this gathered data may include personal information. The present disclosure contemplates that the entities involved with such personal information respect and value privacy policies and practices The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for the reader's convenience, which in no way should limit the scope of the disclosure. Unless otherwise defined, technical and scientific terms used herein have the meaning as commonly understood by one of ordinary skill in the art to which this disclosure pertains. In the case of conflict, the present document, including definitions, will control.

Additional features and advantages of the disclosure will be set forth in the description which follows, and in part, will be obvious from the description or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

As previously described, AVs utilize various sensor systems to perceive and understand the environment around the AVs so that the AVs can operate safely and efficiently. A lidar sensor mounted on an AV collects a lidar point cloud, which is a collection of points that describe the object. Such lidar point clouds can be labeled or processed (e.g., lidar point cloud annotation and/or segmentation), for example, to generate a bounding box around the object to facilitate a spatial understanding of where each object is. Inaccurate identification of the object by omitting any part attached to the object, especially vehicle appendages (e.g., side mirrors of a vehicle, a liftgate on a truck, or an arm of a construction excavator), can cause the incorrect spatial location of the object and further lead to unsafe operation of AVs. Therefore, there exists a need for a labeling system that can accurately identify and label an object, including an appendage that is part of the object. Also, given the large volume of lidar data, labeling can be an important aspect of machine learning, which can enable better identification of objects.

The present technology improves the ability of a perception system, and in particular, a perception system of an autonomous vehicle to identify vehicle appendages. Furthermore, the present technology can associate a vehicle appendage with the vehicle to which it is related. The recognition of the vehicle appendage further improves over the state of the art by allowing bounding boxes to be drawn around the vehicle and its appendage. In some embodiments, multiple bounding boxes can be used, wherein a bounding box is drawn around the vehicle and a bounding box is drawn around the appendage, and the two bounding boxes are related together.

The present technology results in improvements over perception systems that do not identify appendages by ensuring that consumers of the output of the perception system are aware of an object that can potentially influence the path of the autonomous vehicle. The labeling of the appendages can provide additional advantages when appendages are associated with sematic labels that classify the type of appendage. These semantic labels permit consumers of data from the perception system to plan for common behaviors associated with the appendage. Furthermore, the association of the appendage with a vehicle to which it is attached improves the ability of consumers of data from the perception system to associate the behaviors of the appendage with the vehicle, which can be valuable especially when the appendages are misused (e.g., a ramp appendage lengthens a vehicle but does not typically travel a path, if the vehicle drives away with the ramp down, the expected trajectory of the vehicle can be applied to the ramp since it is associated with the vehicle). These and other benefits of the present technology will be addressed herein or made apparent from the descriptions below.

Various examples of the subject technology are discussed with respect to lidar systems used in vehicles for illustrative purposes. Other examples may relate to other types and uses of lidar systems. These examples may be used in various fields and for various purposes.

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Figure 2A:
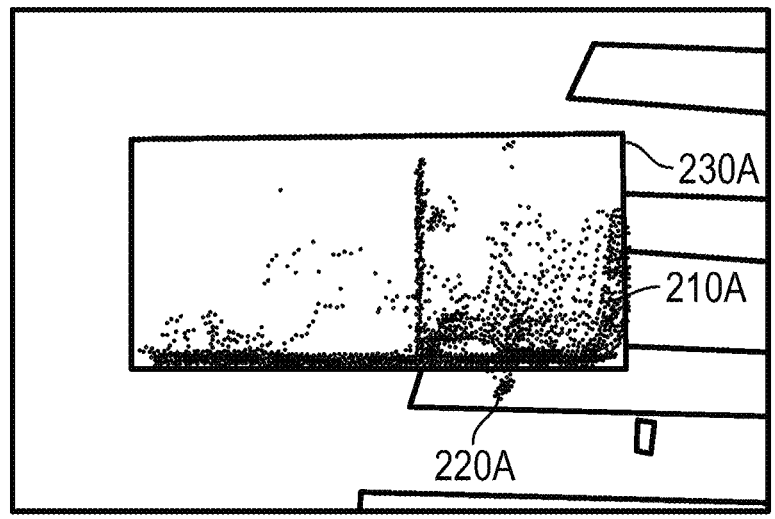
FIGS. 2A and 2B illustrate an example visualization of lidar data in accordance with some aspects of the disclosed technology.
Figure 2B:
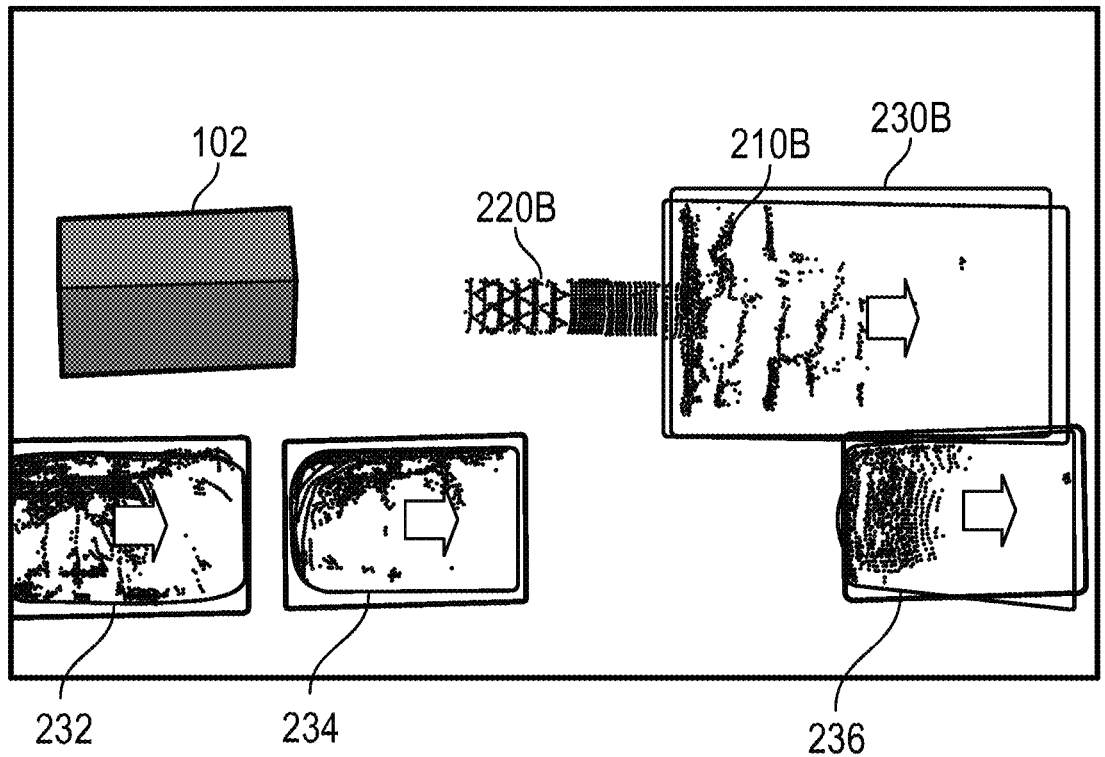

FIGS. 2A and 2B illustrate an example visualization of lidar data 200A and 200B. In some examples, the lidar data illustrated in FIGS. 2A and 2B can include lidar point cloud data detected by a lidar sensor mounted on an AV.

In FIG. 2A, visualization of lidar data 200A includes lidar point cloud for vehicle 210A and lidar point cloud for side mirror 220A. In some examples, lidar data can be processed to generate bounding box 230A for vehicle 210A. In some examples, bounding box 230A can be a rectangle that outlines the object (e.g., vehicle 210A) based on the geometry of vehicle 210A. As shown in FIG. 2A, bounding box 230A is outlined based on the geometry of vehicle 210A that more closely matches the edge of the headlight. As a result, bounding box 230A fails to include side mirror 220A, which is attached to and part of vehicle 210A.

In FIG. 2B, visualization of lidar data 200B illustrates an environment where AV 102 navigates a road and perceives multiple objects, such as truck 210B, vehicle 232, vehicle 234, and vehicle 236 that are detected by a lidar system. In some examples, lidar data can be labeled and processed to generate bounding box 230B. As shown in FIG. 2B, bounding box 230B fails to include ramp 220B that is attached to truck 210B. Such failure can cause AV 102 to crash into ramp 220B as AV 102 may fail to recognize ramp 220B.

Figure 3:
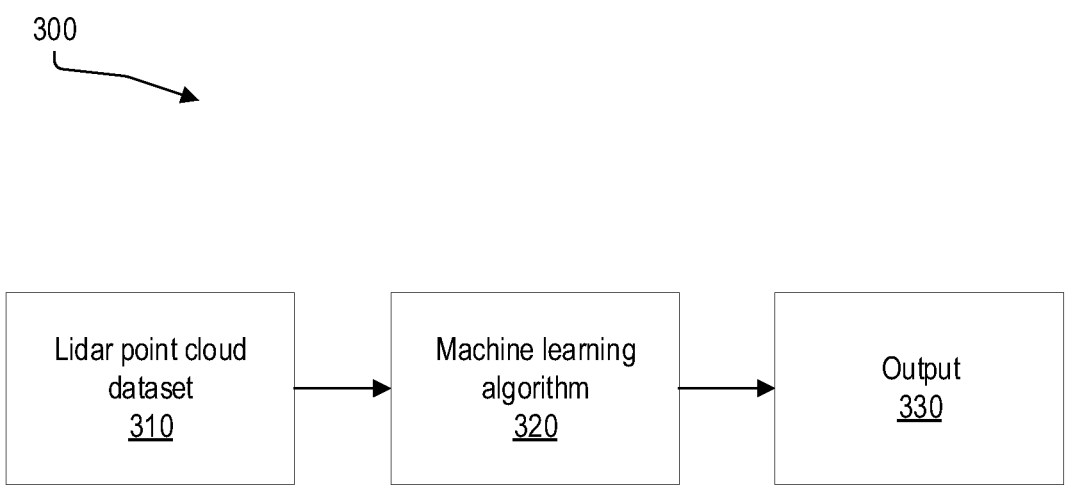
FIG. 3 illustrates an example workflow for training a model for identifying and labeling a vehicle appendage according to some aspects of the disclosed technology.

FIG. 3 illustrates an example workflow 300 for training a model to identify and label a vehicle appendage. Workflow 300 can include but is not limited to, lidar point cloud dataset 310, machine learning algorithm 320, and output 330.

In some examples, lidar point cloud dataset 310 includes lidar point cloud data captured by a lidar sensor on AV 102 during drives. In such instances, lidar data can be stored in AV operational database 124, and later provided to data center 150 for evaluation and enhancement prior to being used by AI/ML platform 154 to train a machine learning model, such as a model that can form part of perception stack 112.

In some examples, lidar point cloud dataset 310 can include lidar point cloud data that is labeled and processed. For example, the lidar point cloud data can be processed to include a bounding box around each object, a label identifying the object within the bounding box, and/or additional information associated with the object (e.g., semantic properties of the object). In some embodiments, lidar point cloud dataset 310 can include some labels that were generated and annotated upon lidar point cloud dataset 310 by perception stack 112. In some embodiments, labels can be revised, or additional labels can be added to lidar point cloud dataset 310 while managed by data management platform 152.

For example, data received from AV 102 can undergo a process called ground truth labeling that can involve algorithms and/or machines that can evaluate lidar data and ensure that bounding boxes around objects are correct and that semantic labels identifying the objects are correct. Even when ground truth labeling is performed by an algorithm, it can be more accurate than labeling provided by perception stack 112 because ground truth labeling is performed in an offline manner where compute time is less sensitive, and ground truth labeling can have access to data that is from earlier in a timeline or later. Since all data that is accessible to ground truth labeling was previously recorded, ground truth labeling can label a frame of lidar points at any point of time and have access to data from points in time shortly after the frame was captured and can use this data to confirm, improve, change, or add labels to lidar point could data set 310.

Some data from lidar point cloud dataset 310 can also be data from simulations. While simulations are scenes initially based on real-world data captured by AVs, the simulations can be used to make modifications to these scenes to increase variability and increase the size of the dataset and the speed of learning by the machine learning model.

Accordingly, in the context of the present technology wherein a machine learning model is being trained to identify appendages to vehicles, lidar point cloud dataset 310 can include lidar point clouds where some number of the point clouds in the dataset represent a vehicle appendage and are labeled to include a bounding box around the vehicle appendage and a semantic label identifying the type of appendage. This labeled data can be achieved by utilizing algorithms to identify previously unlabeled appendages in data collected and stored by data management platform 152, or by adding simulated appendages to vehicles in simulation.

In some embodiments, the present technology can provide a rich context to the vehicle appendage labels. For example, a taxonomy of classifications can be developed that identifies classes of appendages such as, e.g., trailers, mounts, lift-platforms, ramps, large doors, oversized lateral mirrors, etc. In addition, the taxonomy can identify relationships of the appendages to the primary vehicle (fixed mount, articulating mount, stowable, removable, or semi-permanent). In some embodiments, the taxonomy can include properties of the appendages such as whether the appendage is a drivable appendage or not, i.e., whether the appendage is commonly observed on a moving vehicle.

In some examples, some example properties of the appendages that can be included in the taxonomy are attributes relating to a location, for example, left side, right side, rear facing, or ramp. In some examples, the ramp attribute can be added to ramps extending from any door and touching the ground.

For example, vehicle part objects can be labeled based on object relationships (e.g., door, which is part of a car or a car that has part, door) with the corresponding vehicle in addition to identifying its location attribute (e.g., right side, left side, or rear facing of car). Also, such labeling can ensure that both the vehicle and its appendage are included in bounding boxes in a way to reduce the amount of overlapping between two boxes.

In some examples, machine learning algorithm 320 is an algorithm that when trained, can form a portion of perception stack 112. In some instances, machine learning algorithm 320 is configured to process input (i.e., lidar point cloud dataset 310) such as lidar point cloud dataset 310 to generate output 330 and become trained to optimize the object detection (i.e., output 330). In some instances, output 330 can include a label that identifies and classifies the object based on training machine learning algorithm 320. A loss function can be utilized to compare output 330 to the labels provided in the dataset and provide a loss value to the machine learning algorithm 320 as feedback to encourage correct labels and discourage incorrect labels.

In some embodiments, the appendage is labeled separately from any vehicle and only associated with the vehicle. Accordingly, the existence of an appendage may not be directly dependant on any particular vehicle.

In some embodiments, the loss function can be configured to provide loss values for the classification of vehicle appendages, for the placement of a bounding box around the appendage, and for the association of the vehicle appendage to the correct vehicle. In some embodiments, when an appendage is not observed, but the type of vehicle is known to have an appendage, the loss function can also encourage the machine learning model to learn to classify an unseen appendage as existing, but stowed (e.g., ramp or lift-gate that is not in use, or large doors that are closed). In this way, consumers of data coming out of the perception stack can be aware that an appendage could appear from the vehicle.

Figure 4:
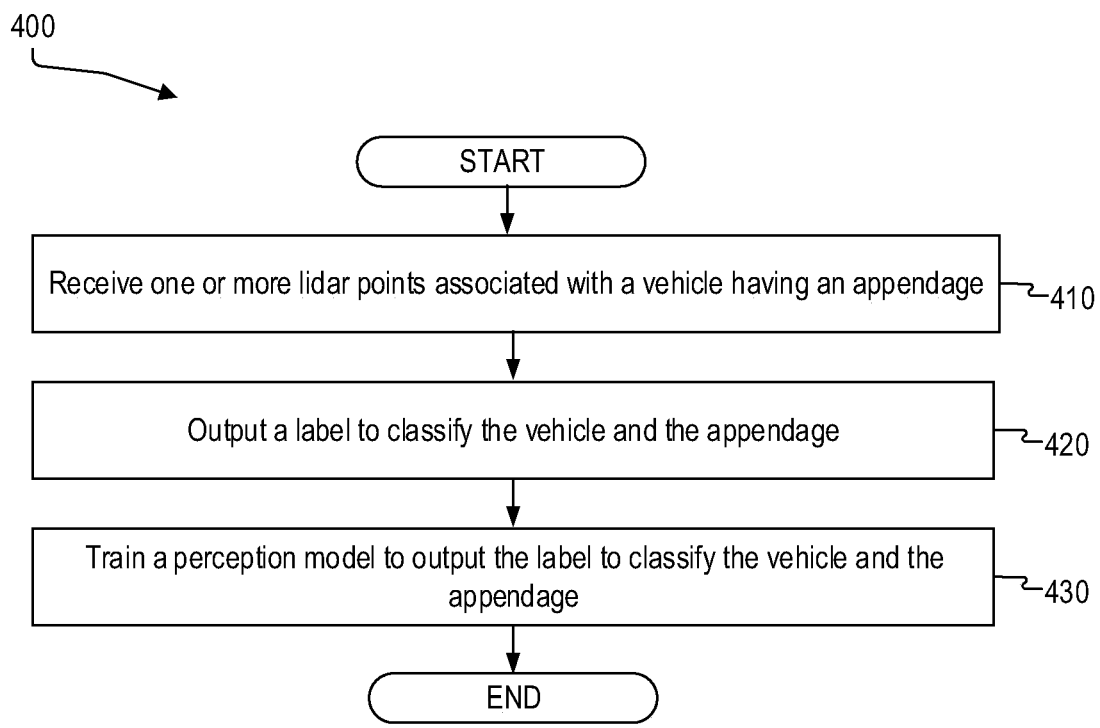
FIG. 4 is a flowchart of a method for identifying and labeling a vehicle appendage according to some aspects of the disclosed technology.

FIG. 4 illustrates an example method 400 for utilizing an algorithm, such as a trained perception algorithm that is part of perception stack 112 to identify and label a vehicle appendage based on input sensor data. Although example method 400 depicts a particular sequence of operations, the sequence may be altered without departing from the scope of the present disclosure. For example, some of the operations depicted may be performed in parallel or in a different sequence that does not materially affect the function of method 400. In other examples, different components of an example device or system that implements method 400 may perform functions at substantially the same time or in a specific sequence.

According to some examples, method 400 includes receiving one or more lidar points associated with a vehicle having an appendage at step 410. For example, perception stack 112 illustrated in FIG. 1 may receive one or more lidar points associated with vehicle 210A or truck 210B illustrated in FIGS. 2A and 2B having an appendage such as side mirror 220A or ramp 220B illustrated in FIGS. 2A and 2B. Examples of vehicle appendages include, but are not limited to, a liftgate, a truck ramp, a bike mount, an arm of a construction excavator, an arm of a garbage truck, a hose of a sewage pump truck, a stop sign affixed to a school bus, or a ski or surfboard rack on a roofline of vehicles, etc.

In some examples, a first portion of the one or more lidar points associated with the vehicle having the appendage represents the vehicle and a second portion of the one or more lidar points associated with the vehicle having the appendage represents the appendage. As shown in FIGS. 2A and 2B, some portion of lidar point cloud represents vehicle 210A or truck 210B and other potion of lidar point cloud represents side mirror 220A or ramp 220B.

According to some examples, method 400 includes outputting a label to classify the vehicle and the appendage at step 420. For example, perception stack 112 illustrated in FIG. 1 may output a label to classify the vehicle (e.g., vehicle 210A or truck 210B) and the appendage (e.g., side mirror 220A or ramp 220B). As a vehicle appendage can be also labeled in addition to the main body of the vehicle, the spatial location of the vehicle can be more accurately determined. As such, the accuracy and precision of the locations output by a perception system (e.g., perception stack 112 illustrated in FIG. 1) can be further improved.

In another example of the outputting the label at step 420, method 400 comprises processing the one or more lidar points associated with the vehicle having the appendage to generate a first bounding box around the vehicle. For example, perception stack 112 illustrated in FIG. 1 may process the one or more lidar points associated with truck 210B illustrated in FIG. 2B having ramp 220B illustrated in FIG. 2B to generate bounding box 230B around truck 210B. In some examples, the appendage is not located within the first bounding box. For example, as illustrated in FIG. 2B, ramp 220B is not located within bounding box 230B.

Further, method 400 comprises processing the one or more lidar points associated with the vehicle having the appendage to generate a second bounding box around the appendage. For example, perception stack 112 illustrated in FIG. 1 may process the one or more lidar points associated with truck 210B having ramp 220B to generate a second bounding box (not shown in FIG. 2B) around ramp 220B.

Further, method 400 comprises associating the appendage to the vehicle based on a relationship between the vehicle and the appendage. For example, perception stack 112 illustrated in FIG. 1 may identify ramp 220B to truck 210B as illustrated in FIG. 2B based on a relationship between truck 210B and ramp 220B.

Further, method 400 comprises associating the second bounding box with the first bounding box. For example, perception stack 112 illustrated in FIG. 1 may associate the second bounding box (not shown in FIG. 2B) that encloses ramp 220B with the first bounding box 230B as illustrated in FIG. 2B.

According to some examples, method 400 includes training a perception model to output the label to classify the vehicle and the appendage at step 430. For example, AI/ML platform 154 illustrated in FIG. 1 may train a perception model to output the label to classify vehicle 210A or truck 210B and its associated appendage such as side mirror 220A or ramp 220B as illustrated in FIGS. 2A and 2B.

In another example of the training the perception model at step 430, method 400 comprises inputting a plurality of instances of lidar points into a machine learning algorithm configured to output, for each instance of lidar points, an identification of the vehicle, the appendage, and a relationship of the appendage to the vehicle when the vehicle with the associated appendage is present in the instance of lidar points.

For example, AI/ML platform 154 illustrated in FIG. 1 may input a plurality of instances of lidar points into a machine learning algorithm configured to output, for each instance of lidar points, an identification of truck 210B, ramp 220B, and a relationship of ramp 220B to truck 210B when truck 210B with the associated appendage such as ramp 220B is present in the instance of lidar points.

In some examples, the identification of the vehicle, the appendage, and the relationship of the appendage to the vehicle is based on a taxonomy. For example, the relationship of the appendage to the vehicle can be categorized as foldable, static, extendable, elevating, etc.

According to some examples, method 400 includes localizing an autonomous vehicle based on the label classifying the vehicle and the appendage at step 420. For example, localization stack 114 illustrated in FIG. 1 may localize AV 102 as illustrated in FIGS. 1 and 2B based on the label classifying the vehicle and the appendage. In FIG. 2B, AV 102 can be localized relative to the location of ramp 220B to avoid any collision.

One of the advantages of the labeling system, as described in the present disclosure, includes a more accurate and consistent way of identifying and labeling a vehicle appendage, which can further enhance object detection. Also, the prediction stack 116 can receive the information relating to the vehicle appendage from the localization stack 114 and the vehicle and the vehicle appendage identified by the perception stack 112 and predict a future path more accurately and efficiently.

Furthermore, the planning stack 118 as illustrated in FIG. 1 can determine how to maneuver or determine a path for AV 102 safely and efficiently based on the more accurate object detection of the vehicle appendage, for example, since the expected trajectory of the AV can be more accurately determined based on the vehicle appendage.

While many of the embodiments disclosed herein have used the example of lidar data as an input, the present technology can also be applied using other data including visual camera data, infrared camera data, high-resolution radar data, spare lidar data, or a fusion of data from a plurality of sensor systems.

Figure 5:
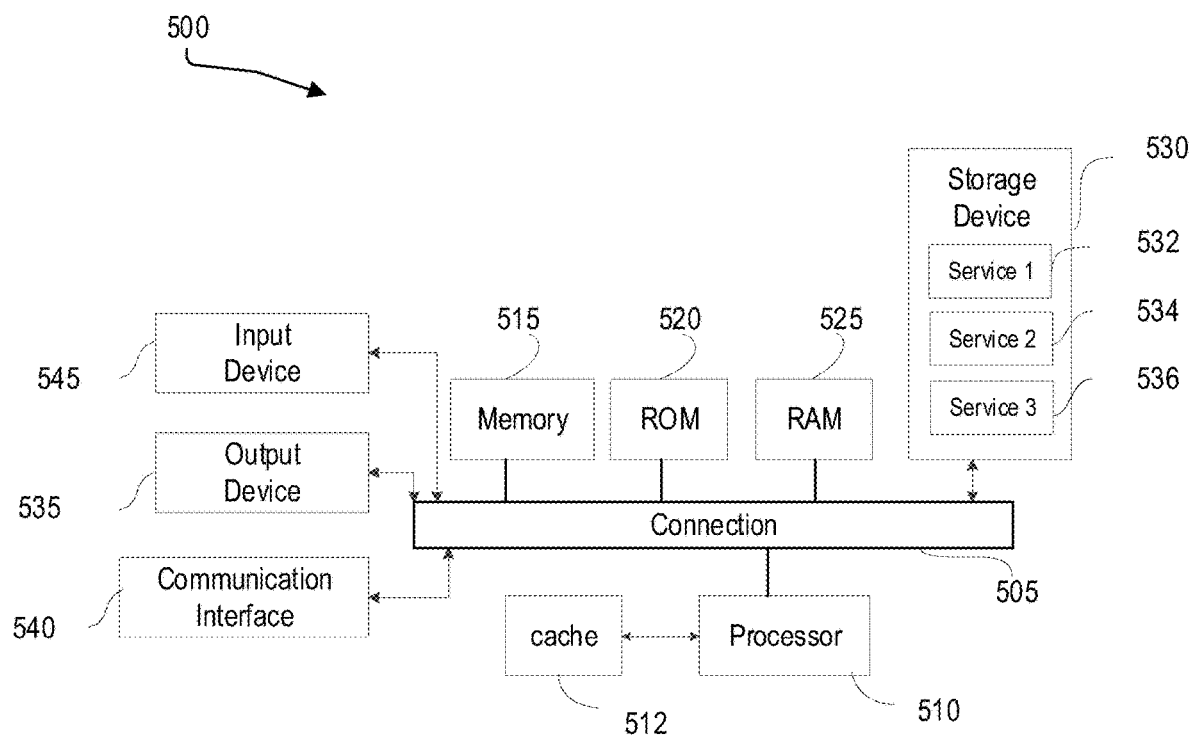
FIG. 5 shows an example of a computing system for implementing certain aspects of the present technology.

FIG. 5 shows an example of computing system 500, which can be for example any computing device making up computing device 110 as illustrated in FIG. 1, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method for identifying and labeling a vehicle appendage, the method comprising:
   receiving one or more lidar points associated with a vehicle having an appendage, wherein a first portion of the one or more lidar points associated with the vehicle having the appendage represents the vehicle and a second portion of the one or more lidar points associated with the vehicle having the appendage represents the appendage;
   outputting a label to classify the vehicle and the appendage; and
   training a perception model to output the label to classify the vehicle and the appendage, wherein the training the perception model comprises:
      inputting a plurality of instances of lidar points, wherein some instances of lidar points represent a vehicle with an associated appendage, into a machine learning algorithm configured to output, for each instance of lidar points, an identification of the vehicle, the appendage, and a relationship of the appendage to the vehicle when the vehicle with the associated appendage is present in the instance of lidar points, and
      inputting a loss value for each output of the machine learning algorithm that confirms correct labels and discourages incorrect labels of the vehicle, the appendage, and the relationship of the appendage to the vehicle, thereby training the machine learning algorithm into the perception model.

2. The method of claim 1, wherein the identification of the vehicle, the appendage, and the relationship of the appendage to the vehicle is based on a taxonomy.

3. The method of claim 1, wherein the outputting the label comprises:
   processing the one or more lidar points associated with the vehicle having the appendage to generate a first bounding box around the vehicle;
   processing the one or more lidar points associated with the vehicle having the appendage to generate a second bounding box around the appendage;
   identifying the appendage to the vehicle based on a relationship between the vehicle and the appendage; and
   associating the second bounding box with the first bounding box.

4. The method of claim 3, wherein the appendage is not located within the first bounding box.

5. The method of claim 1, further comprising:
   localizing an autonomous vehicle based on the label classifying the vehicle and the appendage.

6. A system for identifying and labeling a vehicle appendage, comprising:
   a storage configured to store instructions; and
   a processor configured to execute the instructions and cause the processor to:
      receive one or more lidar points associated with a vehicle having an appendage, wherein a first portion of the one or more lidar points associated with the vehicle having the appendage represents the vehicle and a second portion of the one or more lidar points associated with the vehicle having the appendage represents the appendage,
      output a label to classify the vehicle and the appendage, and
      train a perception model to output the label to classify the vehicle and the appendage, wherein the training the perception model comprises:
         inputting a plurality of instances of lidar points, wherein some instances of lidar points represent a vehicle with an associated appendage, into a machine learning algorithm configured to output, for each instance of lidar points, an identification of the vehicle, the appendage, and a relationship of the appendage to the vehicle when the vehicle with the associated appendage is present in the instance of lidar points, and
         inputting a loss value for each output of the machine learning algorithm that confirms correct labels and discourages incorrect labels of the vehicle, the appendage, and the relationship of the appendage to the vehicle, thereby training the machine learning algorithm into the perception model.

7. The system of claim 6, wherein the identification of the vehicle, the appendage, and the relationship of the appendage to the vehicle is based on a taxonomy.

8. The system of claim 6, wherein the instructions, which when executed by the one or more processors, further cause the one or more processors to:
   process the one or more lidar points associated with the vehicle having the appendage to generate a first bounding box around the vehicle;
   process the one or more lidar points associated with the vehicle having the appendage to generate a second bounding box around the appendage;
   identify the appendage to the vehicle based on a relationship between the vehicle and the appendage; and
   associate the second bounding box with the first bounding box.

9. The system of claim 8, wherein the appendage is not located within the first bounding box.

10. The system of claim 6, wherein the instructions, which when executed by the one or more processors, further cause the one or more processors to:

localize an autonomous vehicle based on the label classifying the vehicle and the appendage.

11. A non-transitory computer readable medium comprising instructions, the instructions, when executed by a computing system, cause the computing system to:
receive one or more lidar points associated with a vehicle having an appendage, wherein a first portion of the one or more lidar points associated with the vehicle having the appendage represents the vehicle and a second portion of the one or more lidar points associated with the vehicle having the appendage represents the appendage;
output a label to classify the vehicle and the appendage; and
train a perception model to output the label to classify the vehicle and the appendage, wherein the training the perception model comprises:
inputting a plurality of instances of lidar points, wherein some instances of lidar points represent a vehicle with an associated appendage, into a machine learning algorithm configured to output, for each instance of lidar points, an identification of the vehicle, the appendage, and a relationship of the appendage to the vehicle when the vehicle with the associated appendage is present in the instance of lidar points, and
inputting a loss value for each output of the machine learning algorithm that confirms correct labels and discourages incorrect labels of the vehicle, the appendage, and the relationship of the appendage to the vehicle, thereby training the machine learning algorithm into the perception model.

12. The computer readable medium of claim 11, the identification of the vehicle, the appendage, and the relationship of the appendage to the vehicle is based on a taxonomy.

13. The computer readable medium of claim 11, wherein the computer readable medium further comprises instructions that, when executed by the computing system, cause the computing system to:
process the one or more lidar points associated with the vehicle having the appendage to generate a first bounding box around the vehicle;
process the one or more lidar points associated with the vehicle having the appendage to generate a second bounding box around the appendage;
identify the appendage to the vehicle based on a relationship between the vehicle and the appendage; and
associate the second bounding box with the first bounding box.

14. The computer readable medium of claim 11, wherein the computer readable medium further comprises instructions that, when executed by the computing system, cause the computing system to:
localize an autonomous vehicle based on the label classifying the vehicle and the appendage.

* * * * *